United States Patent [19]
Yoshida

[11] Patent Number: 5,036,296
[45] Date of Patent: Jul. 30, 1991

[54] FREQUENCY TRACKING CIRCUIT USING SAMPLES EQUALIZED AT DIFFERENT SAMPLING INSTANTS OF SAME CLOCK PERIOD

[75] Inventor: Shousei Yoshida, Tokyo, Japan

[73] Assignee: NEC Corporation, Japan

[21] Appl. No.: 582,147

[22] Filed: Sep. 13, 1990

[30] Foreign Application Priority Data

Sep. 13, 1989 [JP] Japan ................................. 1-238614
Apr. 25, 1990 [JP] Japan ................................. 2-109928

[51] Int. Cl.$^5$ .............................................. H03C 3/00
[52] U.S. Cl. ...................................... 331/17; 331/23; 332/103; 332/127
[58] Field of Search ...................... 331/10, 16, 17, 23, 331/25, 34, DIG. 2; 332/103, 127, 144; 375/53

[56] References Cited

U.S. PATENT DOCUMENTS

| | | | |
|---|---|---|---|
| 4,015,222 | 3/1977 | Werner | 332/103 |
| 4,580,102 | 4/1986 | Myers | 331/17 |
| 4,680,777 | 7/1987 | Saha | 332/103 X |
| 4,730,344 | 3/1988 | Saha | 332/103 X |

OTHER PUBLICATIONS

AFC Tracking Algorithms, Francis D. Natali, IEEE Transactions on Communications, vol. Com.-32, No. 8, Aug. 1984.

Primary Examiner—Robert J. Pascal
Attorney, Agent, or Firm—Ostrolenk, Faber, Gerb & Soffen

[57] ABSTRACT

In a frequency discriminator, a real part of complex-valued symbols which occurs at a first instant of the period of the symbols is equalized so that its intersymbol interference is minimized and an imaginary part of the symbols which occurs at the same first instant is likewise equalized to minimize its intersymbol interference. A real part of the symbols which occurs at a second instant of the period is equalized to minimize its intersymbol interference and an imaginary part of the symbols which occurs at the same second instant is equalized to minimize its intersymbol interference. The equalized first-instant real part is delayed by a first delay circuit by a time interval equal to the interval between the first and second instants, and the equalized first-instant imaginary part is likewise delayed by a second delay circuit. A first multiplier multiplies the output of the first delay circuit with the equalized second-instant imaginary part and a second multiplier multiplies the output of the second delay circuit with the equalized second-instant real part. The output of the second multiplier is subtracted from the output of the first multiplier to generate a signal representative of a frequency variation.

14 Claims, 8 Drawing Sheets

T/4   T/2   3T/4

T

FREQUENCY TRACKING CIRCUIT USING SAMPLES EQUALIZED AT DIFFERENT SAMPLING INSTANTS OF SAME CLOCK PERIOD

BACKGROUND OF THE INVENTION

The present invention relates generally to high-frequency digital communications systems, and more specifically to a frequency discrimination technique for a PSK (phase shift keyed) modulation system operating in the Gigahertz band and to an automatic frequency tracking circuit utilizing the discrimination technique.

With systems operating in the Gigahertz band such as satellite and mobile communications systems, frequency conversion processes at various stages of the transmission route and the Doppler shift caused by the movement of satellite and mobile stations often result in a substantial amount of frequency variation. Particularly in the case of mobile systems, the maximum frequency shift of PSK modulation would become equal to or greater than the highest frequency of the modulating signal.

According to the prior art frequency compensation technique, an automatic frequency tracking circuit is employed in a stage prior to the stage of demodulation. The tracking circuit includes a frequency discriminator that extracts information representing the frequency deviation of the transmitted carrier from received signal and uses it to control the voltage-controlled oscillator of a phase-locked loop.

Frequency discriminators of the cross product type are well known and have been extensively uses. As described in "AFC Tracking Algorithms," F. D. Natali, IEEE Transactions On Communications, Vol. COM 32, No. 8, Aug. 1984, Pages 935 to 947, the discriminator includes a pair of delay circuits, a pair of multipliers and a subtracter. The real part and imaginary part of quasi-coherently detected orthogonal (complex) signals are applied respectively to the delay circuits in which they are delayed so that the real and imaginary parts are respectively time coincident with the imaginary part and the real part at the inputs of the multipliers. The nondelayed versions of the real and imaginary parts are cross-coupled to the multipliers in which they are multiplied with the delayed signals. The outputs of the multipliers are fed to the subtracter to detect the frequency variation of the received signal. Let $r(t)$ denote the quasi-coherently detected orthogonal signals and let $\Delta f$ denote the frequency variation of the received signal, the following is obtained:

$$r(t) = [p(t) + jq(t)]\exp(j2\pi\Delta ft)$$

where, $p(t)$ and $p(t)$ represent respectively the real and imaginary parts of the complex signals. The output of the cross product discriminator $d(t)$ is then given by:

$$d(t) = [p(t)p(t-T) + q(t)q(t-T)] \sin(2\pi\Delta fT) + [q(t)p(t-T) - p(t)q(t-T)] \cos(2\pi\Delta fT) \quad (1)$$

where T is the delay time introduced by each of the delay circuits. If the symbol (clock) period of the received signal is sufficiently smaller than the delay time T, the polarity of the value in the brackets of the first term of Equation (1) is always positive and the frequency variation is represented by the $\sin(2\pi\Delta fT)$ of the first term. On the other hand, the second term of the equation assumes a random value depending on the modulation patterns of the components $p(t)$ and $q(t)$, resulting in the generation of undesired pattern dependent jitter, except for BPSK (biphase shift keyed) signals in which the second term is zero since $p(t) = q(t)$.

In an automatic frequency control loop, a sampler is used for sampling the complex signals at instants ½ of the clock period and a modulation remover is connected to the output of the sampler for removing modulation by the use of frequency multiplication technique prior to coupling to the cross-product discriminator. The output of the discriminator is coupled through a loop filter to a voltage-controlled oscillator which generates quadrature carriers with which the complex signals are multiplied to compensate for a frequency variation. In this case, the output $r(t)$ of the modulation remover and the output $d(nT)$ of the discriminator are given by:

$$r(t) = \exp(j2\pi M\Delta fT)$$

$$d(nT) = \sin(2\pi M\Delta fT)$$

where, M represents the number of phases of the PSK signal and n is an integer. The pull-in range of frequency variations that can be locked must be smaller than $f_s/2M$, where $f_s$ is the clock frequency. Therefore, as the number of modulation phases increases, the pull-in range becomes narrow. Another disadvantage is that at low signal to noise ratios the nonlinearity loss due to frequency multiplication becomes substantial.

SUMMARY OF THE INVENTION

It is therefore an object of the present invention to provide a frequency discriminator which eliminates pattern dependent jitter and the requirement of a modulation remover, and ensures a wide pull-in range for an automatic frequency control loop.

The object of this invention is obtained by detecting the phase difference between samples that occur at different sampling instants of the same clock period for detecting the frequency variation of a received orthogonally modulated signal, since the phase difference between such samples is not influenced by the effect of modulation, but influenced only by the effect of frequency variation.

According to a first aspect of the present invention, there is provided a frequency discriminator adapted to receive orthogonal symbols. The discriminator comprises a first equalizer, or filter for equalizing a real part of the symbols which occurs at a first instant of a period of the symbols so that the intersymbol interference of the real part is reduced to a minimum, a second equalizer for equalizing an imaginary part of the symbols which occurs at the first instant so that intersymbol interference of the imaginary part is reduced to a minimum, a third equalizer for equalizing a real part of the symbols which occurs at a second instant of the period to minimize the intersymbol interference of the real part, and a fourth equalizer for equalizing an imaginary part of the symbols which occurs at the second instant to minimize the intersymbol interference of the imaginary part. The output of the first equalizer is delayed by a first delay circuit by a time interval equal to the interval between the first and second instants, and the output of the second equalizer is delayed by a second delay circuit by a time interval equal to the interval between the first and second instants. A first multiplier multiplies the output of the first delay circuit with the output of the fourth equalizer and a second multiplier multiplies the output of the second delay circuit with the output of the third equalizer. A subtracter is connected to the first and second multipliers for providing subtraction between their output signals.

According to a second aspect of this invention, there is provided an automatic frequency tracking circuit adapted to receive orthogonal symbols transmitted on a carrier. The tracking circuit comprises a loop filter and a frequency compensator for compensating for a frequency variation of the carrier in response to a frequency control signal. The loop filter is connected to the output of the frequency discriminator of this invention and supplies its output to the frequency compensator as said frequency control signal. Preferably, a sampler is provided between the frequency compensator and the discriminator for sampling the orthogonal symbols at the first and second instants as well as at a third instant which corresponds to one-half of the clock period to supply a first sequence of samples occurring at the first instants to the first and second equalizers, a second sequence of samples occurring at the second instants to the third and fourth equalizers and a third sequence of samples occurring at the third instants to an external circuit.

BRIEF DESCRIPTION OF THE DRAWINGS

The present invention will be described in further detail with reference to the accompanying drawings, in which.

DETAILED DESCRIPTION

Figure 1:
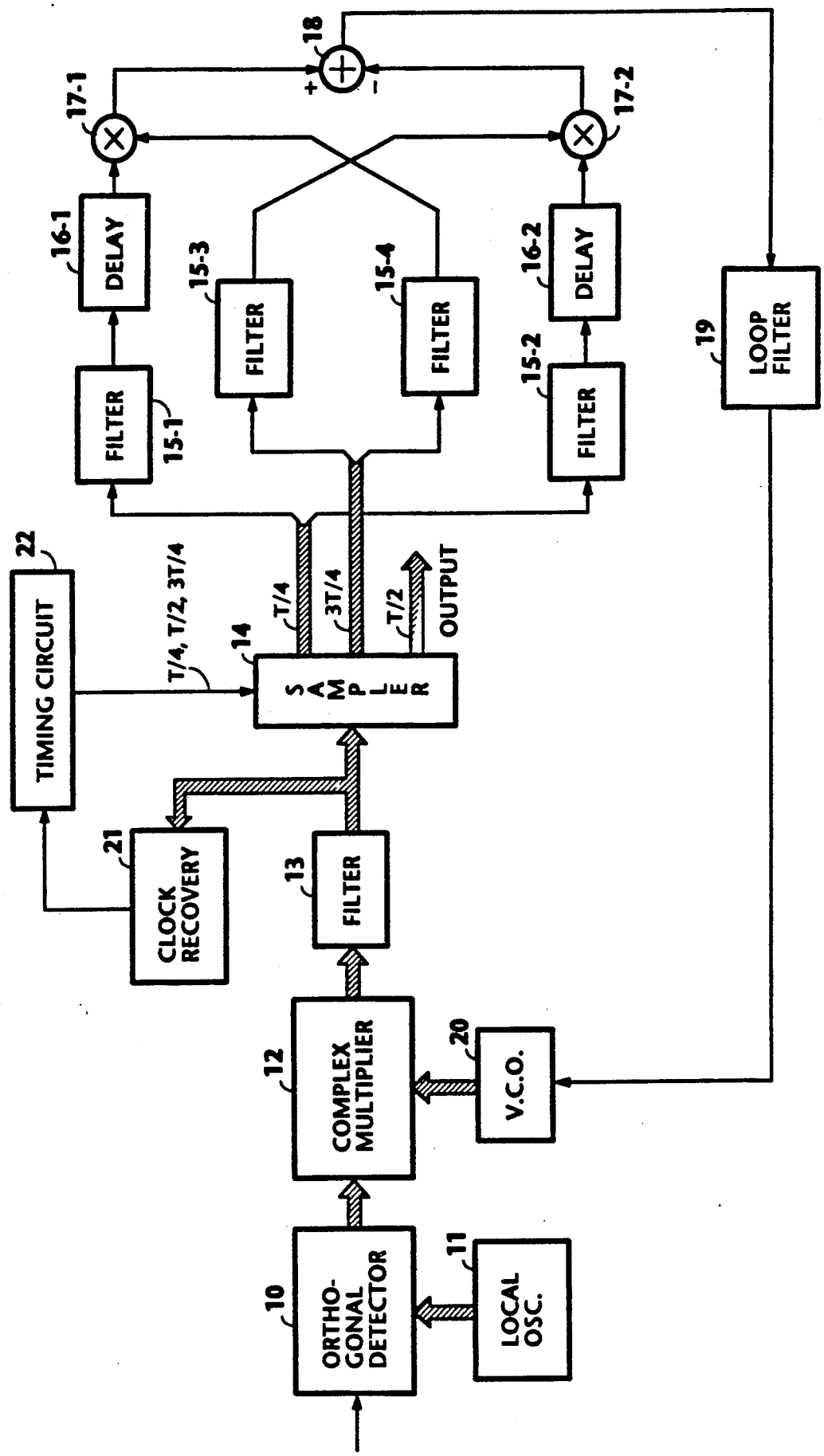
FIG. 1 is a block diagram of an automatic frequency tracking circuit according to one embodiment of the present invention.

An automatic frequency tracking circuit according to one embodiment of the present invention is represented in FIG. 1. The tracking circuit is shown connected to the output of a quasi-coherent detector formed by an orthogonal detector 10 and a free-running local oscillator 11. Detector 10 is adapted to receive a digitally (orthogonally) modulated RF signal and uses quadrature carriers supplied from oscillator 11 to recover the I (in-phase) and Q (quadrature) signals. In the present invention, it is assumed that the incoming signal is a QPSK (quadriphase shift keying) signal whose transmitted carrier is subject to variation due to Doppler shifts.

Figure 2A:
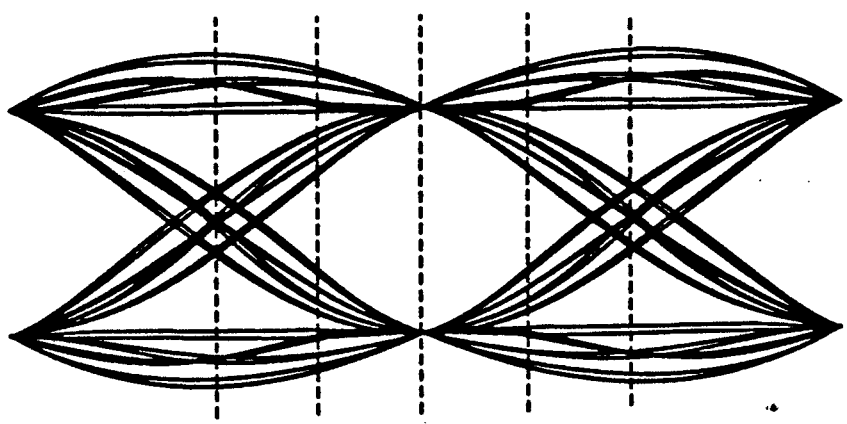
FIGS. 2A, 2B and 2C show eye patterns derived respectively from various points of FIG. 1.

The frequency tracking circuit comprises a complex multiplier 12 which multiplies the I and Q signals with quadrature carriers supplied from a voltage-controlled oscillator 20 to compensate for the frequency variation of the transmitted carrier. Complex-valued outputs from multiplier 12 are supplied to a complex digital filter 13 in which symbols at T/2 instant of each clock period T are equalized so that their intersymbol interference is minimized. The outputs of filter 13, whose eye pattern is shown in FIG. 2A, are fed to a clock recovery circuit 21 the output of which is applied to a timing circuit 22 in which the frequency of the recovered clock is quadrupled and sampling pulses which occur at ¼, ½ and ¾ of the clock period T are produced. The outputs of filter 13 are further applied to a sampler 14, where the complex signals are sampled in response to the sampling pulses from the timing circuit to produce a first sequence of complex samples at T/4 instants, a second sequence of complex samples at instants T/2, and a third sequence of complex samples at instants 3T/4.

The real and imaginary parts (i.e., in-phase and quadrature components) of the first sample sequence are applied to digital filters 15-1 and 15-2 of identical characteristics, respectively, and the real and imaginary parts of the third sample sequence are applied to digital filters 15-3 and 15-4 of identical characteristics, respectively. The samples of the second sequence occur at times which correspond to the signal points of the received QPSK signal, and are used as a frequency-compensated signal for coupling to an external circuit, not shown.

Figure 2B:
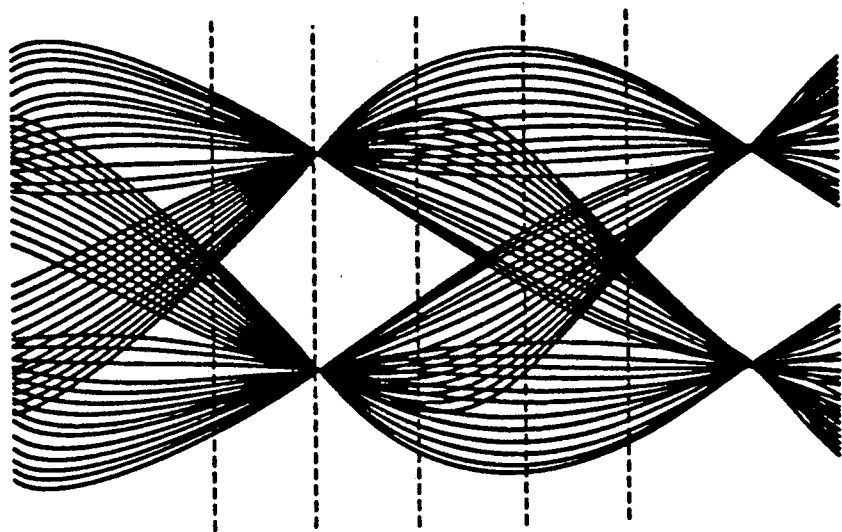
Figure 2C:
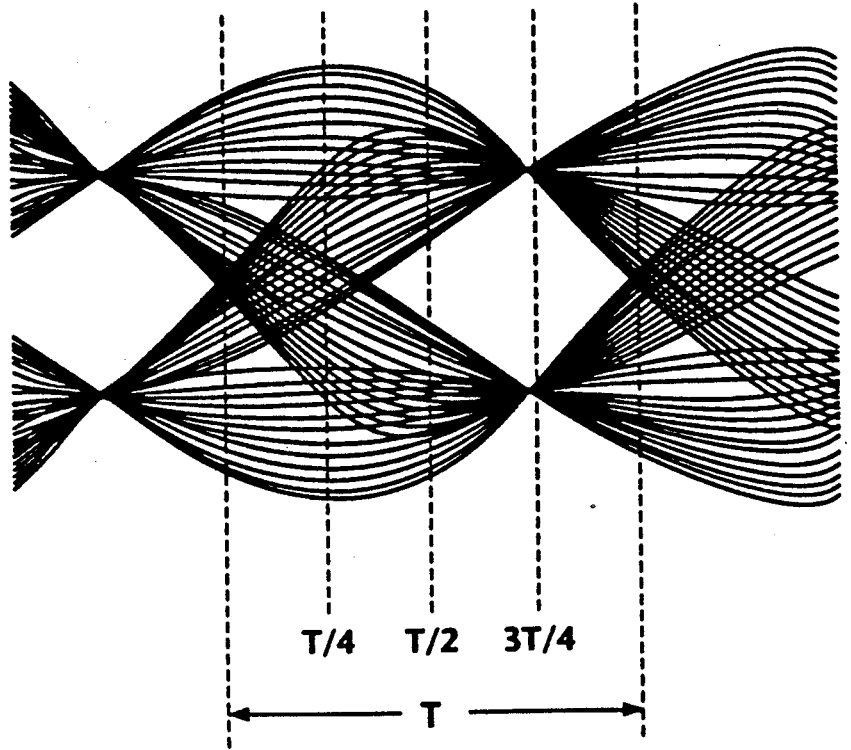

Digital filter 15-1 equalizes its input signal so that the intersymbol interference of the real-part samples at instants T/4 is reduced to a minimum, and filter 15-2 equalizes its input signal so that the intersymbol interference of the imaginary part of the samples at instants T/4 is reduced to a minimum. Likewise, filter 15-3 equalizes its input signal to minimize the intersymbol interference of the real part of samples at instants 3T/4, and filter 15-4 equalizes its input signal to minimize the intersymbol interference of the imaginary part of samples at instants ¾. The eye patterns of the outputs of filters 15-1 and 15-2 are identical to each other and are shown in FIG. 2B, and those of the outputs of filters 15-3 and 15-4 are identical to each other and are shown in FIG. 2C. Thus, the eye openings of the outputs of filters 15-1 and 15-2 is greatest at T/4 and those of the output of filters 15-3 and 15-4 are greatest at instants 3T/4, and the T/2 output of sampler 14 has a greatest eye opening at instants T/2.

The output of filter 15-1 is coupled to a delay circuit 16-1 in which it is delayed by a time interval equal to ½ of the clock period T, the delayed sample being supplied to a multiplier 17-1 in which it is multiplied with the output of filter 15-4. Likewise, the output of filter 15-2 is coupled to a delay circuit 16-2 in which it is delayed by T/2 and the delayed sample is supplied to a multiplier 17-2 in which it is multiplied with the output of filter 15-3. A subtracter 18 is connected to the outputs of multipliers 17-1 and 17-2 to form a cross-product frequency discriminator with sampler 14, filters 15 and delay circuits 16. By subtracting the output of multiplier 17-2 from the output of multiplier 17-1, a signal representative of the frequency variation of the incoming QPSK signal is obtained at the output of subtracter 18. This signal is the output of the discriminator and is averaged by a loop filter 19 and fed to V.C.O. 20 as a frequency control signal to reduce the frequency variation substantially to zero.

It is seen that the frequency variation of a received QPSK is detected from equalized samples at instants $T/4$ and $3T/4$. Since the phase difference which occurs between $4/T$ and $3T/4$ is not affected by modulation, but affected only by frequency variation, the present invention eliminates pattern dependent jitter which would otherwise occur at the end of a pull-in operation (i.e., when the average frequency deviation is substantially reduced to zero). In this way, the present invention can eliminate the requirement of a frequency multiplier which is provided in the prior art discriminator for removing modulation.

Figure 3:
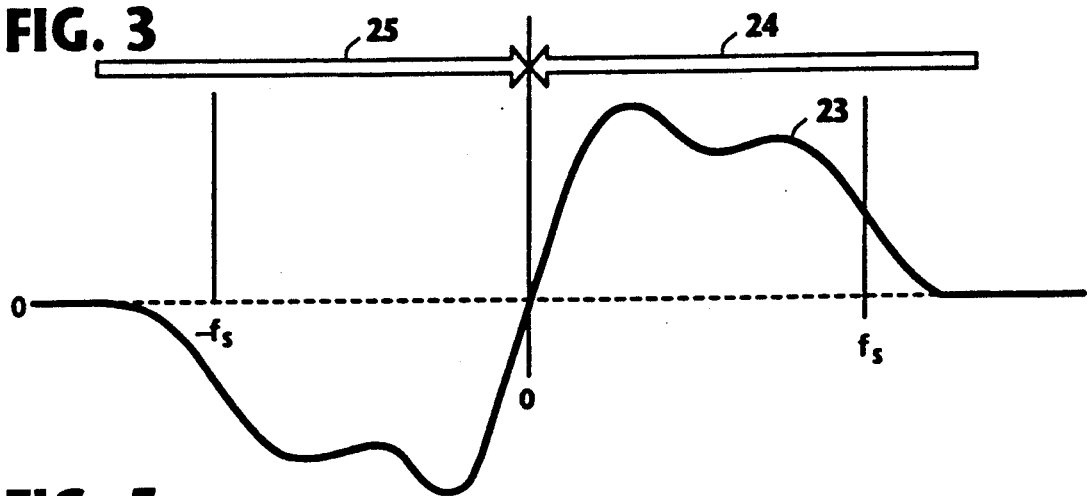
FIG. 3 is a waveform diagram associated with FIG. 1.

The voltage at the output of subtracter 18 of FIG. 1 is in the form as indicated by a broken-line waveform 23 in FIG. 3. If the frequency of the PSK signal is in the range between a limit value $f_s$ on the positive side of the point of zero frequency deviation and a limit value $-f_s$ on the negative side of the zero point, the feedback loop operates in directions as indicated by arrows 24 and 25 to pull it toward the frequency-locked point. However, if it is far away from the limits, the feedback operation is indeterminate.

Figure 5:
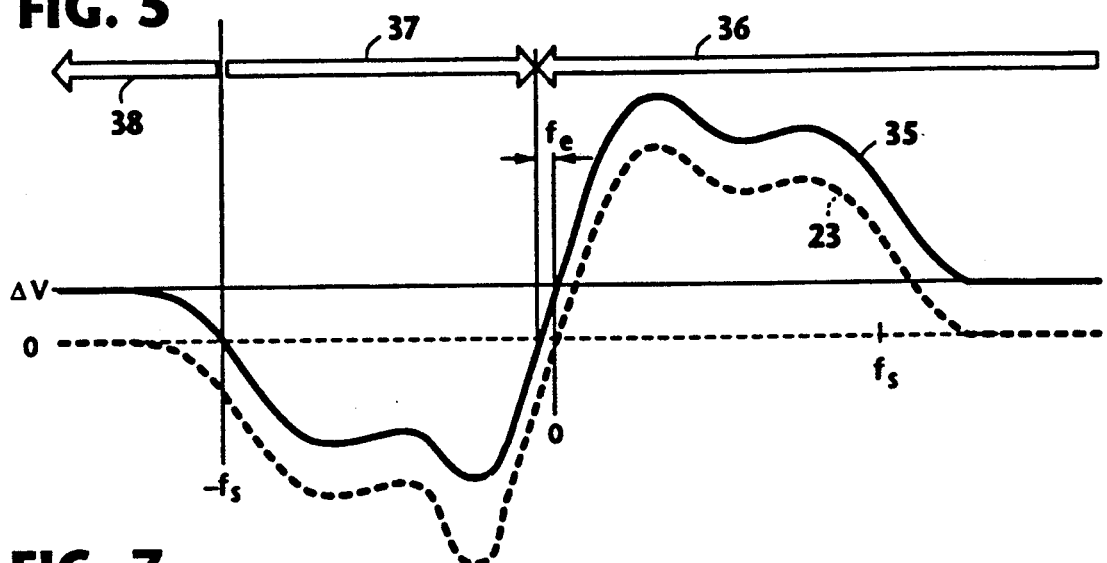
FIG. 5 is a waveform diagram associated with FIG. 4.
Figure 4:
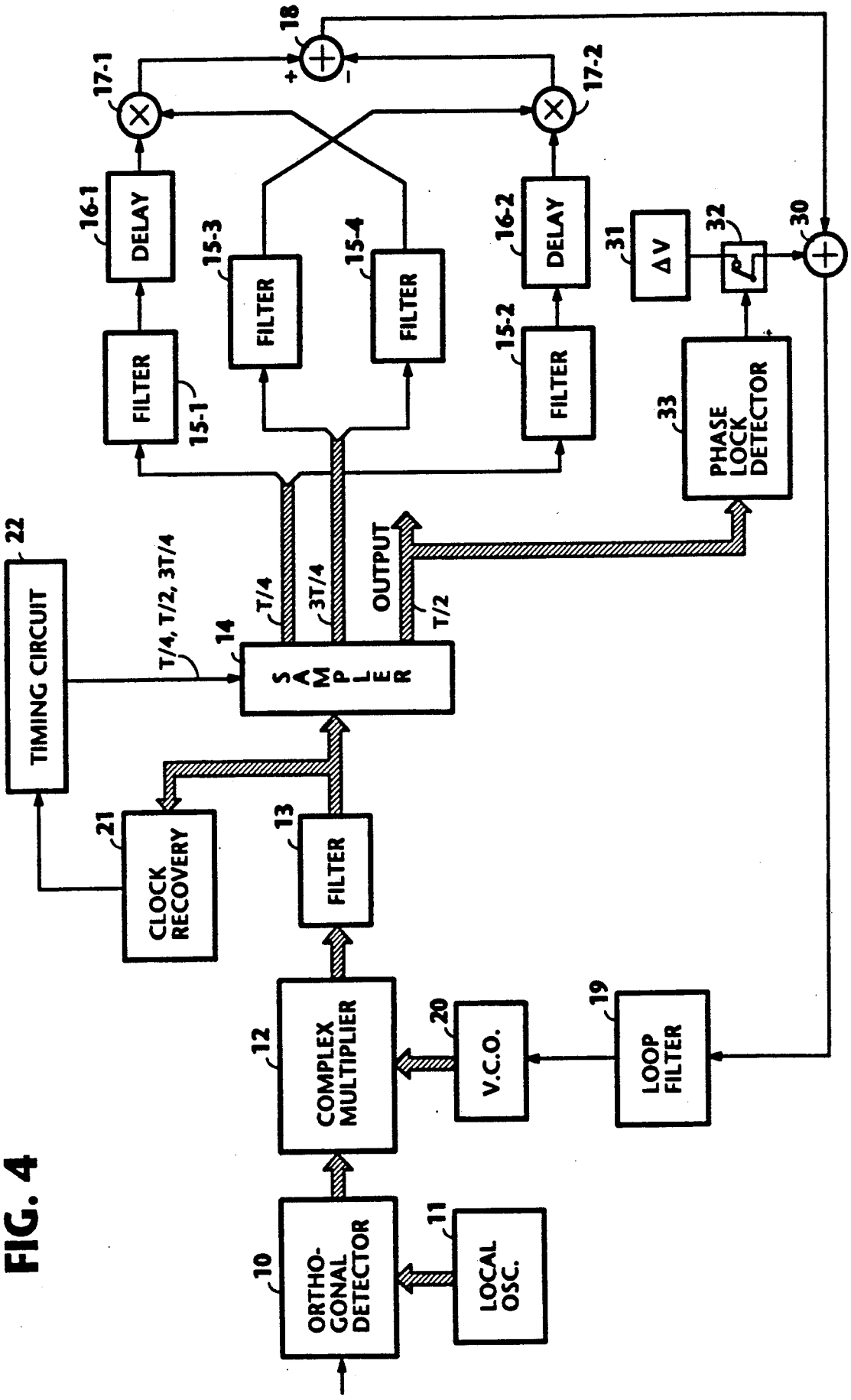
FIG. 4 is a block diagram of an automatic frequency tracking circuit according to a first modification of the present invention.

To overcome this problem, a modified embodiment of this invention is shown in FIG. 4 in which the same numerals are used to indicate parts corresponding to those in FIG. 1. In this modification, an adder 30 is connected between subtracter 18 and loop filter 19. A D.C. voltage source 31 supplies a bias voltage $\Delta V$ through a switch 32 to adder 30 so that the frequency control voltage is raised as indicated by a solid-line waveform 35 as shown in FIG. 5. If the frequency is higher than the positive limit $f_s$, the feedback loop operates in a direction indicated by an arrow 36 to pull it toward the frequency-locked point and if it lies between the negative limit $-f_s$ and the frequency-locked point, the feedback loop operates in an opposite direction indicated by an arrow 37. If it is more negative than the negative limit $-f_s$, the feedback loop initially operates to move the control point in the same direction as indicated by an arrow 38 as when the frequency is more positive than the positive limit $f_s$, and the loop filter 19 eventually becomes overloaded and the frequency deviation assumes a positive value, switching the control point to the positive side of the phase lock point.

The application of the bias voltage in this manner shifts the phase-lock point of the loop by an amount $f_e$ from the true phase lock point. To remove this frequency deviation error, a phase lock detector 33 is connected to the $(T/2)$ output of sampler 14 to produce an output signal when it detects that the loop is frequency-locked. Switch 32 responds to this output signal by removing the bias voltage from adder 30.

The bias voltage $\Delta V$ is appropriately determined in relation to the highest value of the frequency control voltage so that the feedback operation between the limits $f_s$ and $-f_s$ is not adversely affected by the bias voltage. However, the feedback operation outside the limits would become too slow if the bias voltage is much lower than the maximum of the frequency control voltage.

Figure 7:
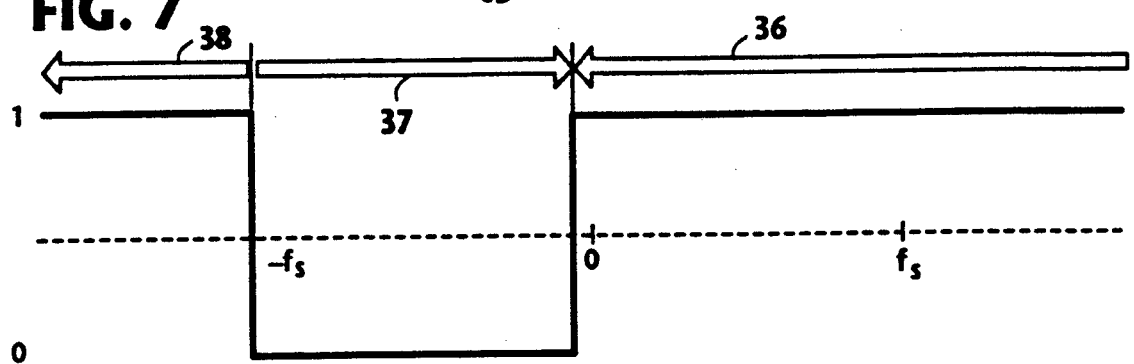
FIG. 7 is a waveform diagram associated with FIG. 6.
Figure 6:
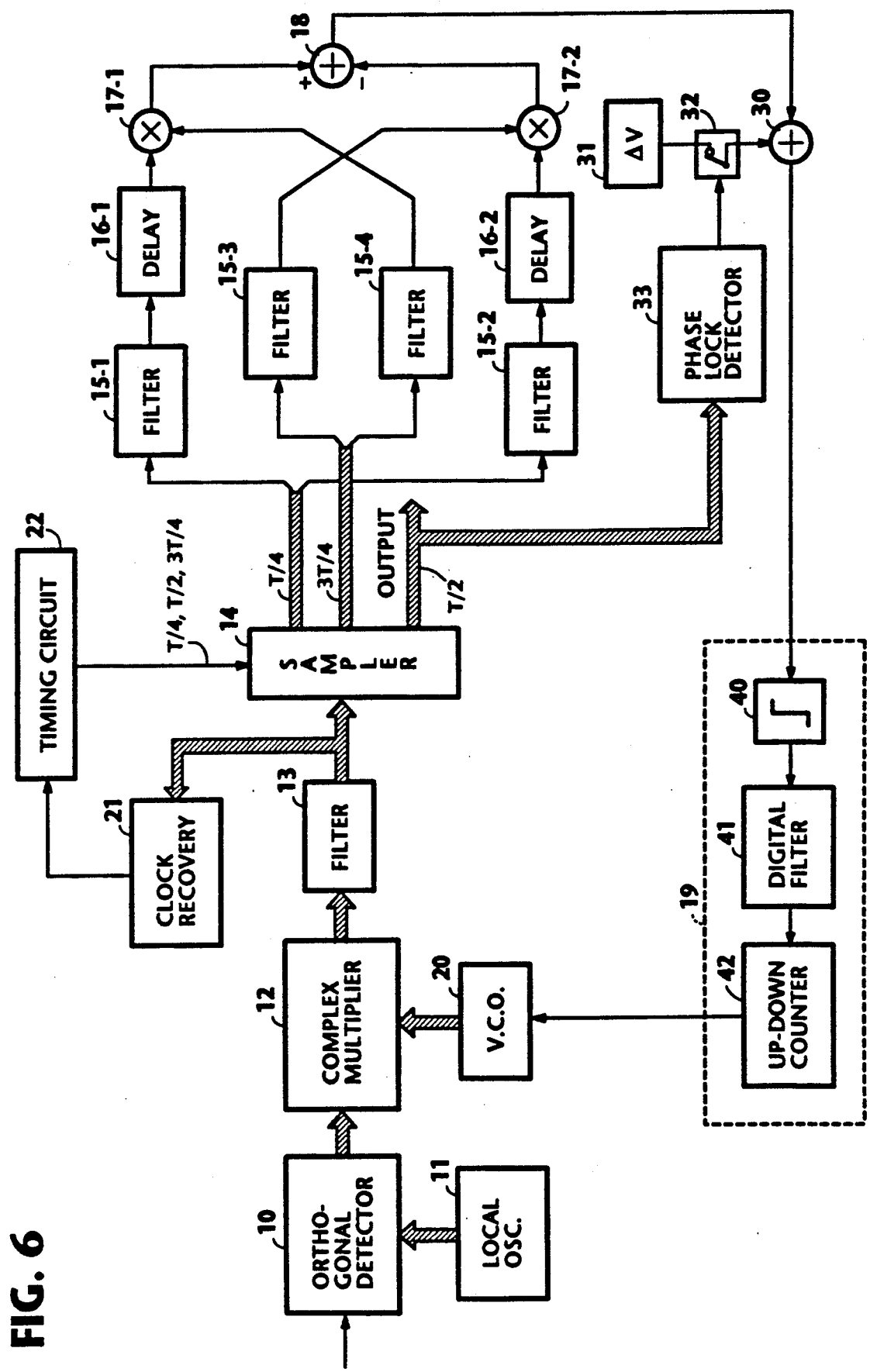
FIG. 6 is a block diagram of an automatic frequency tracking circuit according to a second modification of the present invention.

FIG. 6 is a further modification of the present invention in which the same numerals are used to indicate parts corresponding to those in FIG. 4. In FIG. 6, loop filter 19 is formed by a limiter 40 and a digital filter 41 connected thereto. Digital filter 41 is a random-walk filter, an AND filter, or the like for averaging the output of limiter 40. Limiter 40 produces a high level voltage output when the output of adder 30 is higher than a specified positive voltage level and a low level voltage output when it is lower than a specified negative voltage level (see FIG. 7). An average value of the binary signal from limiter 40 is derived by digital filter 41 and supplied to a self-resettable up-down counter 42 in which it is integrated over time to produce a frequency control signal for coupling to V.C.O. 20. Therefore, when the frequency deviation is outside of limits $f_s$ and $-f_s$, the frequency control voltage is at high voltage level with which pull-in operation is effected at a sufficiently high speed as well as when it lies between the limits.

Figure 9:
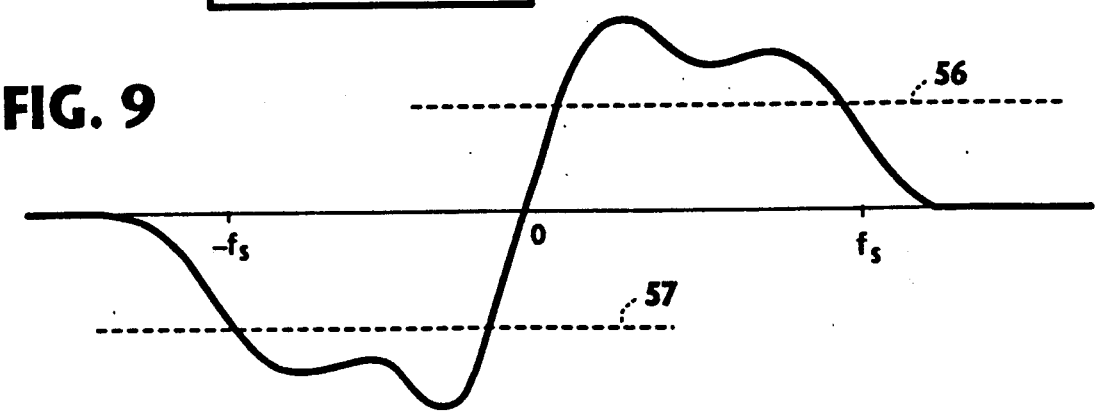
FIG. 9 is a waveform diagram associated with FIG. 8.
Figure 8:
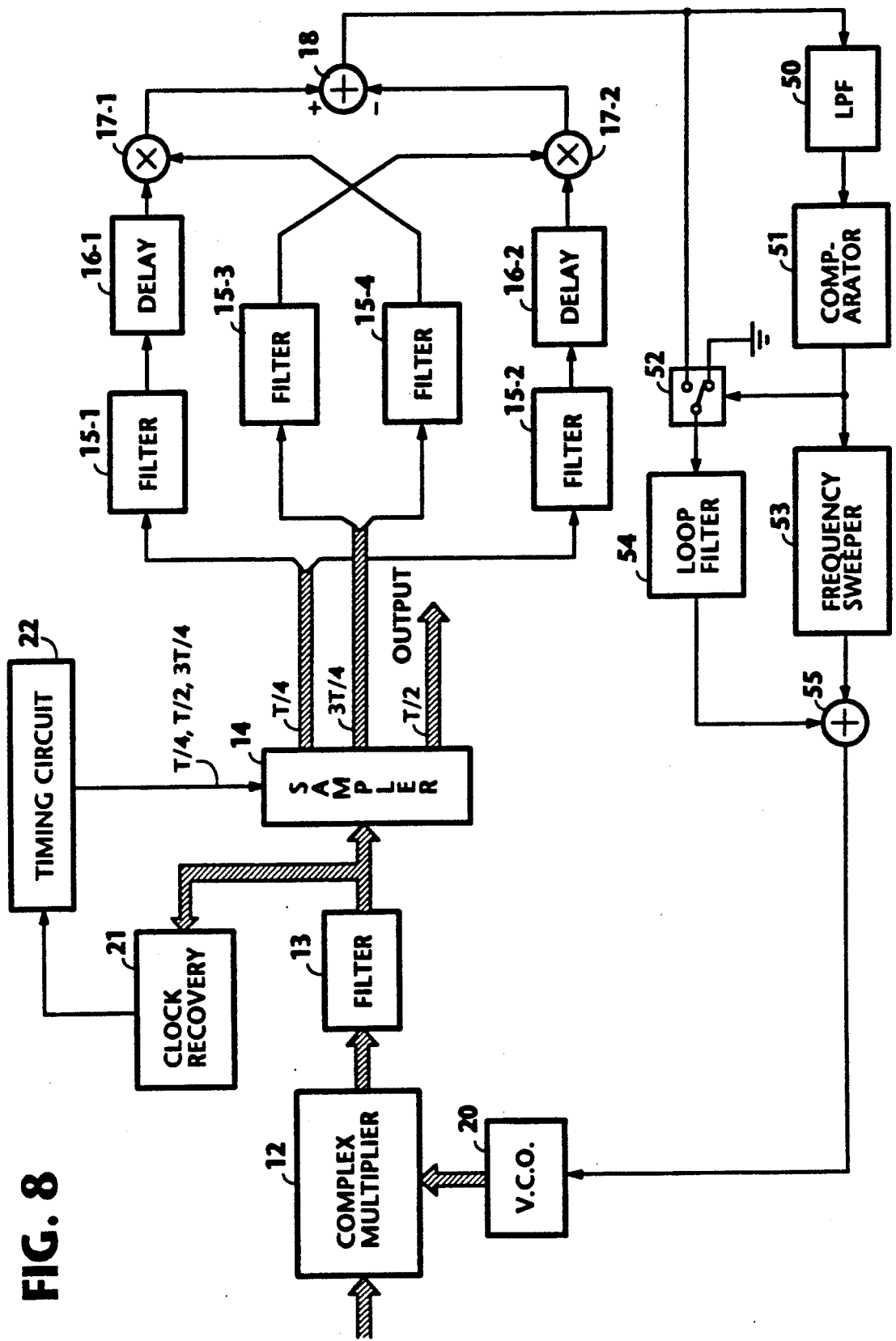
FIG. 8 is a block diagram of an automatic frequency tracking circuit according to a third modification of the present invention.

A further improvement of this invention is illustrated in FIG. 8 in which parts corresponding to those in FIG. 1 are marked with the same numerals as used in FIG. 1. In FIG. 8, the output of subtracter 18 is connected to a low-pass filter 50 and to a first terminal of a switch 52 the second terminal of which is connected to ground. The effect of the low-pass filter 50 is to average out the output voltage of subtracter 18 and supplies it to a comparator 51 in which it is compared with positive and negative threshold values which are respectively indicated by broken lines 56 and 57 in FIG. 9, which are respectively set between the maximum positive output voltage of subtracter 18 in the absence of noise and its maximum negative output voltage. The outputs of loop filter 54 and sweeper 53 are summed by an adder 55 whose output is fed to V.C.O. 20.

When the discriminator output initially lies between the positive and negative thresholds, comparator 51 produces a low-level output, or sweep-mode signal which causes frequency sweeper 53 to generate a time-varying voltage so that the output of V.C.O. 20 is quickly swept across in search of the phase lock point. During this sweep mode, the input of loop filter 54 is held at the ground potential. Therefore, the control point of the loop quickly approaches the limit $f_s$ or $-f_s$, with the result that the output of low-pass filter 50 exceeds one of the threshold levels, and comparator 51 produces a high-level output, or precision-mode signal. The precision-mode signal causes switch 52 to couple the output of subtracter 18 to loop filter 54 and freeze the frequency sweeper 53 so that its output is held at the most recent value of the sweep voltage, which is summed with the output of loop filter 54 and fed to V.C.O. 20 to continue pull-in operation using the output of loop filter 54.

Figure 10:
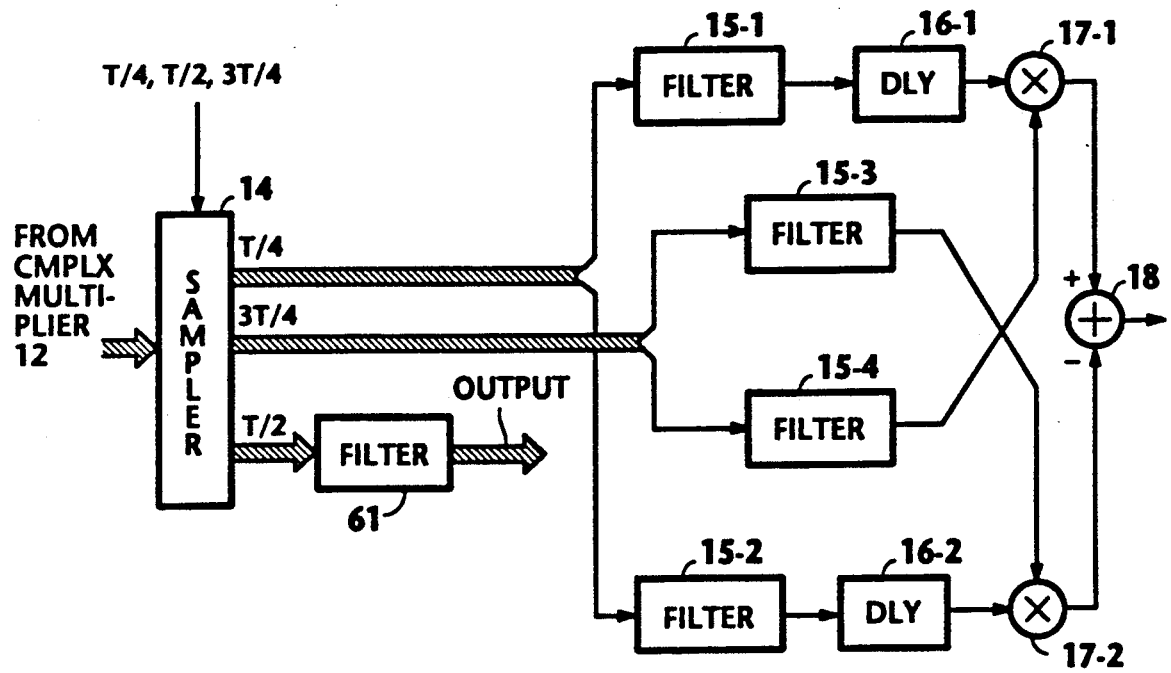
FIGS. 10 to 12 are block diagrams illustrating alternative variations of the present invention.
Figure 11:
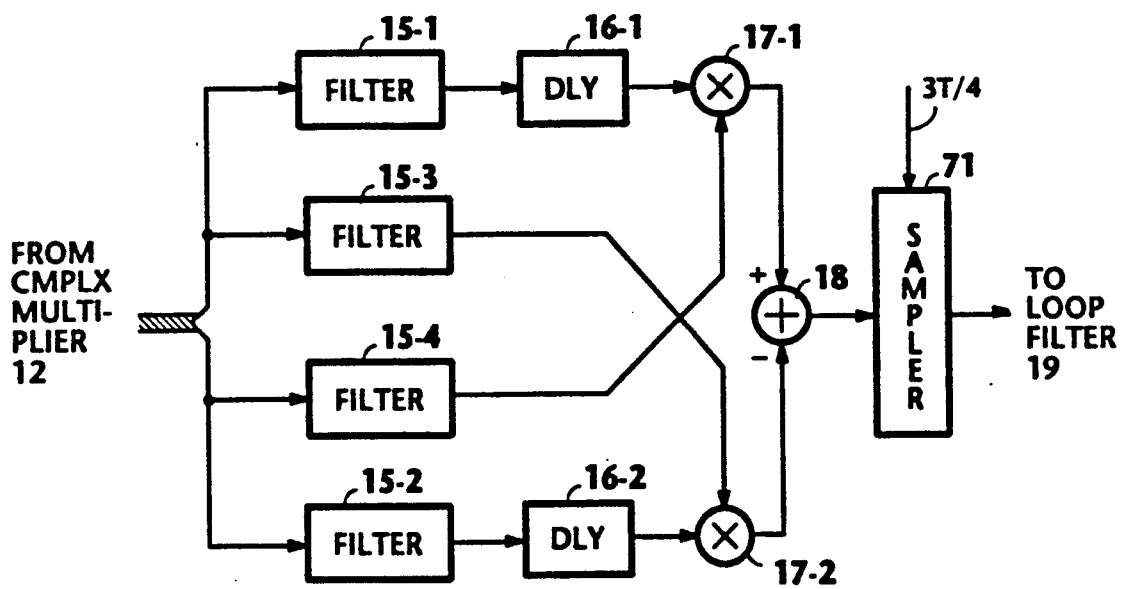
Figure 12:
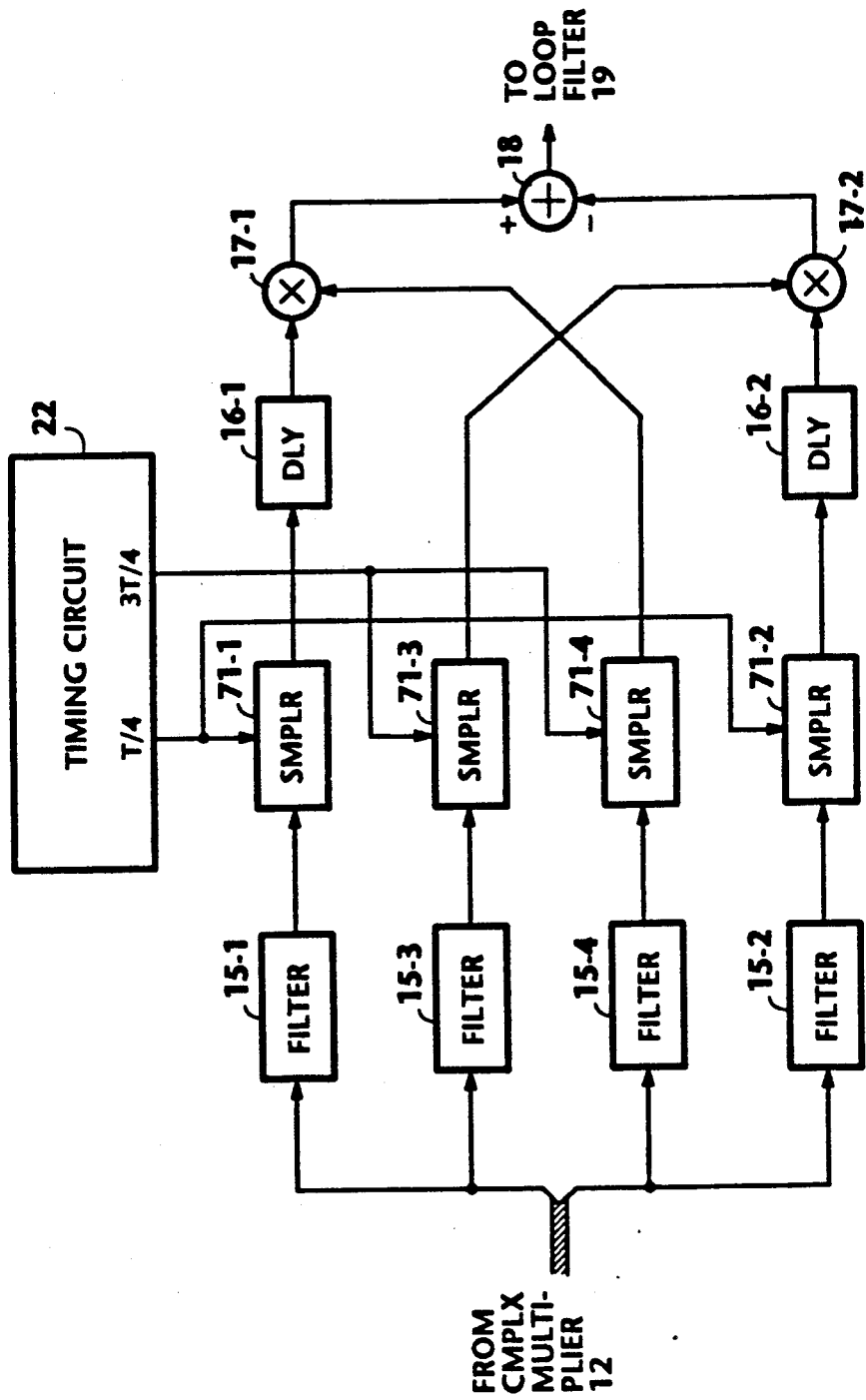

The foregoing description shows only preferred embodiments of the present invention. Various modifications are apparent to those skilled in the art. FIGS. 10 to 12 show alternate variations of the frequency discriminator of this invention.

In FIG. 10, a digital filter 61 is connected at the $T/2$ output of sampler 14 and the filter 13 of the previous embodiments is dispensed with and the output of complex multiplier 12 is directly coupled to the input of sampler 14. In FIG. 11, a sampler 71, which may be implemented as an analog-to-digital converter, is connected to the output of subtracter 18 and the sampler 14 of the previous embodiments is dispensed with, coupling the outputs of complex multiplier 12 direct to filters 15-1 through 15-4. Sampler 71 is supplied with sampling pulse $3T/4$ to generate a sequence of samples that occur at instants $3T/4$ which are time coincident with the samples appearing at the output of subtracter 18. The output of sampler 71 is fed to the loop filter 19.

Alternatively, samplers 71-0–71-4 may be used instead of the sampler of FIG. 11 as shown in FIG. 12. In this variation, samplers 71-1–71-4 are respectively connected to the outputs of filters 15-1–15-4. Samplers 71-1 and 71-2 are responsive to sampling pulses T/4, while samplers 71-3 and 71-4 are responsive to sampling pulses 3T/4.

What is claimed is:

1. A frequency discriminator adapted to receive orthogonal symbols, comprising:
   first equalizer means for equalizing a real part of said symbols which occurs at a first instant of a period of said symbols so that intersymbol interference of said real part is reduced to a minimum;
   second equalizer means for equalizing an imaginary part of said symbols which occurs at said first instant so that intersymbol interference of said imaginary part is reduced to a minimum;
   third equalizer means for equalizing a real part of said symbols which occurs at a second instant of said period so that intersymbol interference of said real part is reduced to a minimum;
   fourth equalizer means for equalizing an imaginary part of said symbols which occurs at said second instant so that intersymbol interference of said imaginary part is reduced to a minimum;
   first delay means for delaying an output signal of said first equalizer means by a time interval equal to the interval between said first and second instants;
   second delay means for delaying an output signal of said second equalizer means by a time interval equal to said interval between the first and second instants;
   first multiplier means for multiplying an output signal of said first delay means with an output signal of said fourth equalizer means;
   second multiplier means for multiplying an output signal of said second delay means with an output signal of said third equalizer means; and
   subtracter means for providing subtraction between output signals of said first and second multiplier means.

2. A frequency discriminator as claimed in claim 1, wherein said first instant of said period corresponds to a first submultiple of said period and said second instant of said period corresponds to a second submultiple of said period.

3. A frequency discriminator as claimed in claim 1, further comprising sampler means connected to inputs of said first, second, third and fourth equalizer means for sampling said received orthogonal symbols at an instant of said period corresponding to a signal point of said orthogonal symbols.

4. A frequency discriminator as claimed in claim 1, further comprising sampler means for sampling an output signal of said subtracter means at said second instant of said period.

5. A frequency discriminator as claimed in claim 1, further comprising first and second sampler means for respectively sampling output signals of said first and second equalizer means at said first instant and applying output samples to said first and second delay means, respectively, and third and fourth sampler means for respectively sampling output signals of said third and fourth equalizer means at said second instant and applying output samples to said second and first multiplier means, respectively.

6. An automatic frequency tracking circuit adapted to receive orthogonal symbols transmitted on a carrier, comprising:
   a frequency compensator for compensating for a frequency variation of said carrier in response to a frequency control signal applied thereto;
   first equalizer means for equalizing a real part of an output signal of said frequency compensator which occurs at a first instant of a period of said symbols so that intersymbol interference of said real part is reduced to a minimum;
   second equalizer means for equalizing an imaginary part of said output signal of said compensator which occurs at said first instant so that intersymbol interference of said imaginary part is reduced to a minimum;
   third equalizer means for equalizing a real part of said output signal of said frequency compensator which occurs at a second instant of said period so that intersymbol interference of said real part is reduced to a minimum;
   fourth equalizer means for equalizing an imaginary part of said output signal of said frequency compensator which occurs at said second instant so that intersymbol interference of said imaginary part is reduced to a minimum;
   first delay means for delaying an output signal of said first equalizer means by a time interval equal to the interval between said first and second instants;
   second delay means for delaying an output signal of said second equalizer means by a time interval equal to said interval between the first and second instants;
   first multiplier means for multiplying an output signal of said first delay means with an output signal of said fourth equalizer means;
   second multiplier means for multiplying an output signal of said second delay means with an output signal of said third equalizer means;
   subtracter means for providing subtraction between output signals of said first and second multiplier means; and
   a loop filter for deriving said frequency control signal from an output signal of said subtracter means.

7. An automatic frequency tracking circuit as claimed in claim 6, further comprising:
   a D.C. voltage source; and
   summing means for summing the D.C. voltage from said source with the output signal of said subtracter means and applying an output signal of said summing means to said loop filter.

8. An automatic frequency tracking circuit as claimed in claim 7, further comprising phase lock detector means for detecting a phase lock condition and means for removing said D.C. voltage from said summing means in response to the detection of a phase lock by said phase lock detector means.

9. An automatic frequency tracking circuit as claimed in claim 7, wherein said loop filter comprises:
   a limiter for converting the output signal of said summing means to a binary signal;
   a digital filter for averaging said binary signal; and
   an up-down counter for integrating binary output signals from said digital filter and applying the integrated signals to said frequency compensator as said frequency control signal.

10. An automatic frequency tracking circuit as claimed in claim 6, further comprising:

a low-pass filter connected to the output of said subtracter;

a comparator for generating a first signal when an output signal of said low-pass filter is outside of a specified range and a second signal when said output signal of the low-pass filter is inside of said specified range;

switch means for providing disconnection between said subtracter and said loop filter in response to the first signal of said comparator and establishing a connection between said subtracter and said loop filter in response to the second signal of said comparator;

a frequency sweeper for generating a frequency sweep signal in response to the first signal of said comparator and holding an instantaneous value of said frequency sweep signal in response to the second signal of said comparator; and summing means for summing output signals of said loop filter and said frequency sweeper and applying a sum of said outputs to said frequency compensator as said frequency control signal.

11. An automatic frequency tracking circuit as claimed in claim 6, wherein said first instant of said period corresponds to a first submultiple of said period and said second instant of said period corresponds to a second submultiple of said period.

12. An automatic frequency tracking circuit as claimed in claim 6, further comprising sampler means connected between said frequency compensator and said first, second, third and fourth equalizer means for sampling the output signal of said frequency compensator at said first and second instants and at an instant corresponding to one-half of said period, and wherein said sampler supplies a first sequence of samples occurring at the first instants to the first and second equalizer means, a second sequence of samples occurring at the second instants to the third and fourth equalizer means and generates a third sequence of samples occurring at the third instants for coupling to an external circuit.

13. An automatic frequency tracking circuit as claimed in claim 6, further comprising sampler means for sampling the output signal of said subtracter means at said second instant.

14. An automatic frequency tracking circuit as claimed in claim 6, further comprising first and second sampler means for respectively sampling output signals of said first and second equalizer means at said first instant and applying output samples to said first and second delay means, respectively, and third and fourth sampler means for respectively sampling output signals of said third and fourth equalizer means at said second instant and applying output samples to said second and first multiplier means, respectively.

* * * * *

UNITED STATES PATENT AND TRADEMARK OFFICE
CERTIFICATE OF CORRECTION

PATENT NO. : 5,036,296
DATED : July 30, 1991
INVENTOR(S) : Shousei YOSHIDA

It is certified that error appears in the above-identified patent and that said Letters Patent is hereby corrected as shown below:

Column 1, line 21, delete "highest";

line 30, change "phase-locked" to --frequency tracking--;

line 40, change "so that the real and imaginary parts are" to --by a predetermined amount of time.--;

line 41, delete "respectively time coincident with the imaginary part";

line 42, delete "and the real part at the inputs of the multipliers.";

line 54, change "p(t)" (second occurrence) to --q(t)--;

line 62, change "smaller" to --greater--;

Column 2, line 14, change "r(t)" to --$r(nT_s)$--;

line 17, change "$r(t)=\exp(j2\pi M \Delta ft)$" to --$r(nT_s)=\exp(2\pi M \Delta fnT_s)$, where $T_s$ is the clock period--;

UNITED STATES PATENT AND TRADEMARK OFFICE
CERTIFICATE OF CORRECTION

PATENT NO. : 5,036,296
DATED : July 30, 1991
INVENTOR(S) : Shousei YOSHIDA

It is certified that error appears in the above-identified patent and that said Letters Patent is hereby corrected as shown below:

Column 2, line 19, change "$d(nT)=\sin(2\pi M \Delta fT)$" to

--$d(nT_s)=\sin(2\pi M \Delta fT_s)$--;

line 24, before "fs/2M" insert -- $\pm$ --;

line 27, change "nonlinearity" to --nonlinear--.

Signed and Sealed this

First Day of June, 1993

Attest:

MICHAEL K. KIRK

Attesting Officer

Acting Commissioner of Patents and Trademarks